Nov. 14, 1950    R. C. RUSSELL    2,530,180
MAGNETIC CLUTCH

Filed Nov. 13, 1945    2 Sheets-Sheet 1

INVENTOR.
Robert C. Russell
BY
McDonald and Teagno
ATTORNEYS

Nov. 14, 1950     R. C. RUSSELL     2,530,180
MAGNETIC CLUTCH

Filed Nov. 13, 1945     2 Sheets-Sheet 2

INVENTOR.
ROBERT C. RUSSELL
BY
McDonald and Teague
ATTORNEYS

Patented Nov. 14, 1950

2,530,180

UNITED STATES PATENT OFFICE 2,530,180

MAGNETIC CLUTCH

Robert C. Russell, Cleveland Heights, Ohio, assignor to Eaton Manufacturing Company, Cleveland, Ohio, a corporation of Ohio Application November 13, 1945, Serial No. 628,053

4 Claims. (Cl. 192—90)

This invention relates to clutches and more particularly to electromagnetically disengaged clutches.

Broadly the invention comprehends the provision of a spring packed plate clutch having electromagnetic disengagement.

Although, numerous electromagnetic clutches have been developed and manufactured, none have been previously devised for efficient, successful application wherein requirements of compact structure and effective clutch engagement and disengagement are of vital importance such as in the application of a clutch to an engine cooling fan. The instant development provides a compact clutch that possesses high torque transmitting qualities in comparison to size because of the provision of an effective armature-coil-magnet arrangement to effect a quick positive disengagement of the clutch as required.

An object of the invention is the provision of an efficient compact spring packed-electromagnetically disengaged plate clutch.

Another object of the invention is the provision of an electromagnetically disengaged clutch wherein maximum pull of the armature for disengaging the clutch is obtained.

Another object of the invention is the provision of a spring packed-electromagnetically disengaged clutch, said disengaging means being effective for movement over a substantial distance to thus provide free running of the clutch and reducing idling drag when disengaged.

A further object of the invention is the provision of an electromagnetically disengaged plate clutch permitting of greater tolerances in manufacture and assembly of the electromagnetic means because of the design and arrangement of the component parts thereof.

A yet further object of the invention is the provision of a spring packed plate clutch having electromagnetic disengaging means wherein greater tolerances can be provided between the magnet pole face and armature face because of the effective magnetic flux path generated and the shape of the cooperating pole and armature faces.

Other objects and advantages of the invention will appear from the following description taken in connection with the drawings, forming a part of the specification; and in which.

Figure 1:
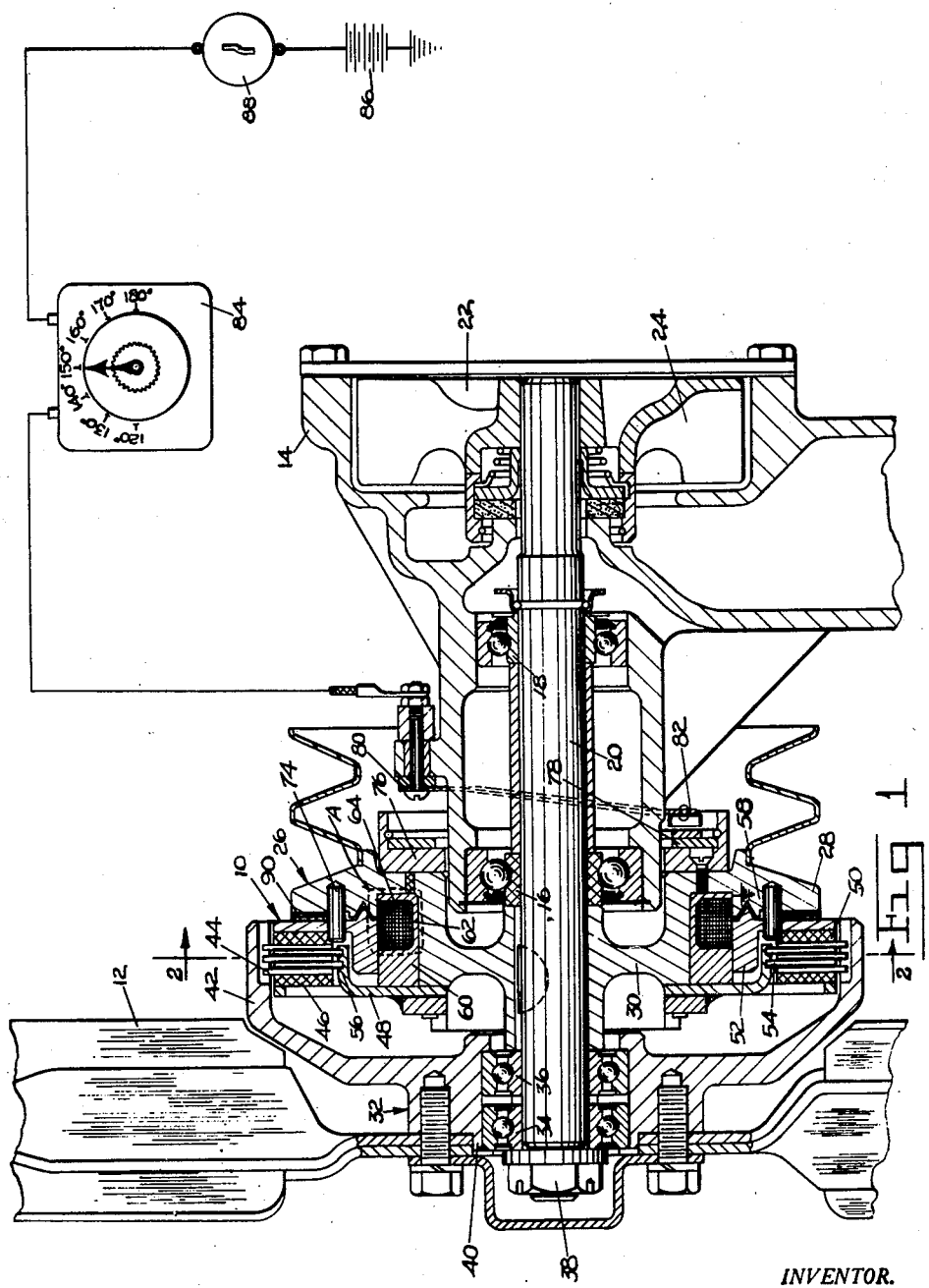
Fig. 1 is a vertical cross sectional view of the clutch constituting the basis of the invention as applied to a fan drive of an internal combustion engine.
Figure 2:
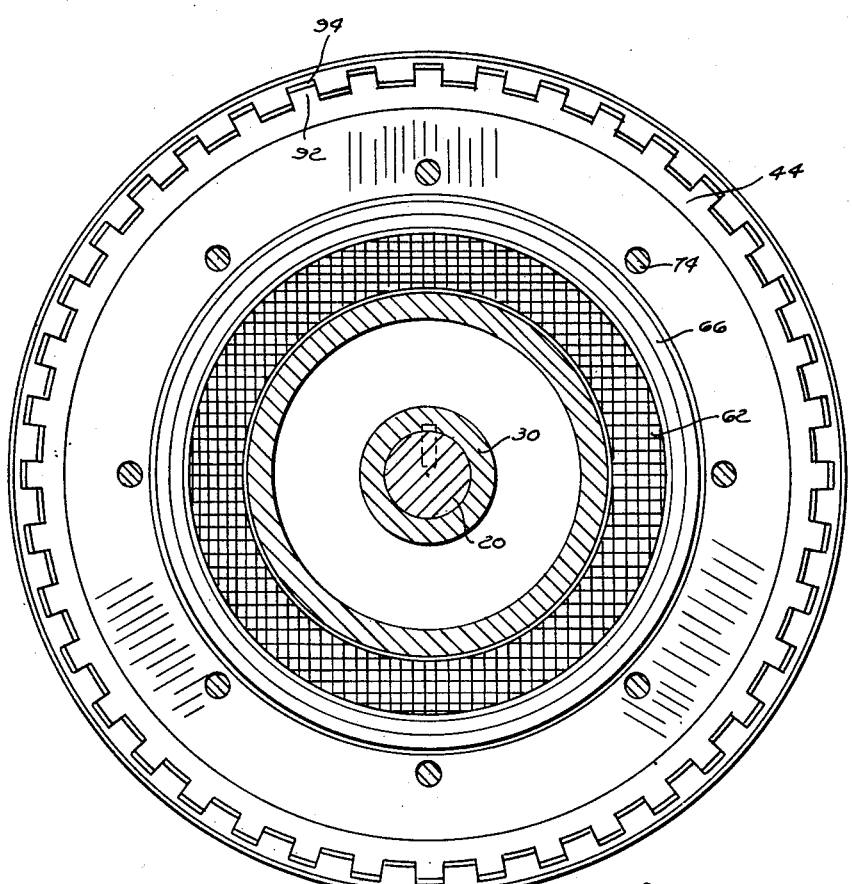
Fig. 2 is a sectional view taken along line 2—2 of Fig. 1.

In the field of electromagnetically operated clutches many structures have been devised for either electromagnetic engagement or disengagement clutches with the intention of effecting maximum pull for selected size. It is of vital importance in designing clutches of this type that the arrangement of the electromagnetic armature, coil and magnet provide for the most efficient flux path and extend the effectiveness of the magnetic attraction to the maximum length of movement between the armature and magnetic faces to thus permit of greater tolerances in manufacture and assembly of component parts of the clutch.

In the present development provision is made of a spring packed plate clutch having electromagnetic disengaging means. The electromagnetic disengagement means comprises cooperative annular coil, magnet and armature wherein provision is made of annular tapered axial cooperating pole faces between the armature and magnet so as to provide for a maximum length of axial movement between the armature and magnet and thus permit of greater spacing between the plates when the clutch is disengaged thereby lessening idling drag while at the same time possessing effective magnetic attraction when the clutch is engaged to the extent of reasonable or maximum allowable wear between the plates. As a means of effecting maximum pull of the magnet for any given size the armature is arranged upon a spool suitably fixed in the magnetic flux path such as to present a large area for transfer of magnetic flux at the point where the armature slides thereby maintaining constant and improving the air gap bridging characteristics at this point. Further the armature is provided with an internal diameter sufficiently greater than said coil to allow free axial movement over said coil. The coil is wound upon the spool and electrically protected therefrom by paper-thin insulation or suitable paint coating. This arrangement of coil and armature provides for the shortest, most direct magnetic flux path, thus effecting a maximum conservation of the generated flux as well as increasing the pull of the magnet. In so effecting a compact structure of high efficiency, a clutch of this nature is suitably adaptable for installation with engine cooling or the like apparatus to so control operation thereof as desired wherein size and efficiency are specific design requirements.

Referring to the drawings for more specific details of the invention 10 represents generally a spring packed electro-magnetically disengaged plate clutch as employed in connection with the cooling apparatus of an internal combustion engine for controlling the operation of an engine cooling fan 12 therefor.

A housing 14 adapted to be suitably secured to the front end of an internal combustion engine cylinder has mounted thereon bearings 16 and 18 adapted to support a rotatable shaft 20 and provides therein a pump chamber 22 for the reception of a water pump impeller 24 affixed to the shaft 20.

A V-belt pulley 26, adapted to be suitably driven from a power take off of the engine includes a body portion 28 and a hub 30 fixedly secured to the shaft 20 whereas the fan 12 is suitably secured to a member 32 journaled upon a pair of bearings 34 and 36 mounted upon shaft 20 and held thereon by a nut 38 threaded on the end of the shaft.

The member 32 securing the fan 12 includes a hub 40 and a rim 42, the rim 42 supporting thereon for limited movement relative thereto annular plates or discs 44, the end ones of which are adapted to respectively cooperate with a friction lining 46 supported on end plate 48 fixedly secured upon the hub 30 of pulley 26 and a friction lining 50 supported on an armature 52. Plates or discs 54 alternately interposed between the discs 44 and adapted to be frictionally engaged thereby are mounted axially slidable upon axial fingers 56 constituting part of the plate 48.

The body 28 of pulley 26 constitutes a magnet 58 adapted to cooperate with the armature 52 and has fixed thereon an annular spool member 60 of magnetic material which has wound therein a coil 62 electrically shielded from the spool 60 by paper-thin insulation 64. The external diameter of the spool 60 is preferably of slightly greater diameter than the coil so as to receive the armature in sliding telescoping relationship thereon and permit the sliding of the armature across the outer periphery of the coil without interfering therewith. By so providing for sliding engagement of the armature upon the spool 60 at a diameter substantially at or beyond the external diameter of the coil a maximum circumferential area for transfer of magnetic flux is obtained, thus improving the air gap bridging qualities of the magnetic circuit.

Figures 3, 4, 5:
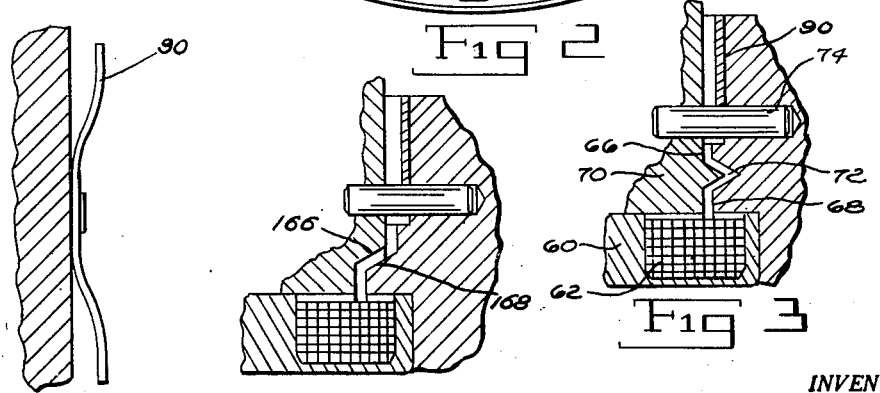
Fig. 3 is an enlarged fragmentary sectional view of the armature and magnet arrangement.
Fig. 4 is a fragmentary cross-sectional view of a modified form of armature and magnet arrangement.
Fig. 5 is an end view of the spring packing means for the plates of the clutch shown by Fig. 1.

As a means of providing increased efficiency the respective cooperating pole face 66 of the armature and pole face 68 of the magnet shown by Fig. 3 have mating male and female annular tapered portions 70 and 72 respectively. It is to be observed that because of the tapered construction of mating pole faces 66 and 68 the permissible axial movement between the armature and magnet is greater than would ordinarily be the case if the faces were flat, inasmuch as the magnetic flux is dissipated from an increased area and in closer proximity than that presented by two pole faces of flat parallel structure.

The armature 52 in addition to being slidable upon spool 60 is supported upon and driven by pins 74 secured in the body 28.

The coil 62 has one end grounded and another connected through body 28 to a member 76 secured to the body and thence to a copper or other suitable material contactor plate or pickup band 78.

A contactor member 80 insulatingly mounted on the housing 14 has resilient fingers 82 adapted to engage the band 78, the member 80 in turn being connected to a thermostatic switch 84 adapted to be mounted in the cylinder head of an engine not shown. The thermostatic switch 84 is connected to a battery or other suitable electric source of current 86 controlled as by a switch 88 such as the ignition switch of the engine.

The discs 44 and 54 are normally packed together into friction locking engagement between the friction linings 46 and 50 by a number of circumferential wave springs 90 interposed between armature 52 and magnet 58.

The discs 44 are provided with splines or fingers 92 received in close conformity by axial splines 94 in rim 42, such that when the clutch is disengaged the discs 44 will normally move away from the discs 54 because of the springing tendency of the discs when the load is removed and will assume positions spaced from the discs 54 said finger 92 acting to frictionally hold the discs in spaced relation and thereby minimize any tendency of drag between the discs 44 and 54.

The magnetic flux path for the electromagnetic disengaging means is designated by the dotted line A and as noted follows a short circuitous path about the coil.

Fig. 4 illustrates a modified form of the armature and magnet arrangement illustrated by the preferred embodiment shown by Figs. 1 and 5 wherein the armature and magnet have corresponding cooperating tapered or angular pole faces 166 and 168. The pole faces 166 and 168 function in an identical manner with the faces 66 and 68, the only difference residing in the fact that the male and female nature of the pole faces 66 and 68 provide for a comparatively greater area between the cooperating faces than the angular faces of poles 166 and 168 for a given axial dimension. The effectiveness of pull, that is, the permissible distance through which pole faces 66 and 68 are movable away from and toward each other is appreciably no greater than the allowable movement between pole faces 166 and 168.

In a normal operation of the clutch as applied to the cooling apparatus, shown by Fig. 1 with the engine cold, upon turning on the ignition switch 88 and starting the engine the V-belt pulley 26 is suitably driven from the engine resulting in rotating the shaft 20 and pump impeller 24 thus providing for circulation of liquid through the circulating system of the engine and thereby providing for uniform heating of the liquid throughout the engine cylinder block and head.

During the initial heating of the liquid the thermostatic switch 84 operates in a closed circuit position with the result that the coil 62 is energized through the flow of current to the coil by way of contactor fingers 82 and band 80 causing magnetic attraction between the tapered portions 70 and 72 of the faces 66 and 68 of the armature 52 and magnet 58 against the resistance of springs 90 thereby effecting a disengagement of the clutch from the driving means therefor.

When the liquid in the engine reaches a predetermined temperature as determined by the thermostatic switch setting, the thermostat responds to the coolant temperature thus breaking the circuit and disrupting flow of current to the coil. Upon de-energization of the coil the springs 90 act to pack the friction linings and plates against one another thereby effecting a couple between the driven pulley and fan. With a change in coolant temperature of the engine over a predetermined range from time to time as conditions necessitate, the coil will accordingly be energized or de-energized thus operating to clutch or de-clutch the fan from its driving relation with the pulley.

Although the spring packed electromagnetically disengaged clutch herein defined is described as applied to an engine cooling apparatus it is not to be so construed as a limitation in its application but merely as an adaptable and practical use of so compact and efficient a clutch.

While the invention has been described in connection with certain specific embodiments, the principle involved is susceptible of numerous other applications that will readily occur to persons skilled in the art. The invention, therefore, is limited only as indicated by the scope of the appended claims.

What I claim is:

1. A mechanically engaged and electro-magnetically disengaged clutch comprising a driving means, a pole piece driven thereby having a tapered face, an annular magnetic coil insulatingly mounted on the pole piece radially inwardly disposed from the face of the pole piece, an armature mounted for sliding, non-rotative arrangement on a portion of the pole piece radially outwardly disposed from the coil having a tapered face cooperable with the tapered face on the pole piece and a clutch engaging surface, a driven member having a clutch engaging surface cooperable with the clutch engaging surface on the armature, resilient means interposed between the armature and pole piece normally holding the clutch engaging surfaces in frictionally locked relation and biasing the tapered faces of the pole piece and armature apart, and electrical means for energizing the coil for disengaging the clutch engaging surfaces.

2. A mechanically engaged and electromagnetically disengaged clutch comprising a driving means, a pole piece driven thereby having a tapered face, an annular magnetic coil insulatedly mounted on the pole piece radially inwardly disposed from the tapered face of the pole piece, an armature mounted for sliding, non-rotative arrangement on an axially extended portion of the pole piece radially outwardly disposed at a point slightly beyond the outer circumference of the coil having a tapered face complementary to and cooperable with the tapered face on the pole piece and a clutching surface radially disposed outwardly of the tapered faces on the armature and pole piece, a plate fixedly secured on the extended portion of the pole piece axially disposed from the clutch engaging surface of the armature, a driven means having clutch engaging surfaces disposed axially between the clutch engaging surfaces of the plate and armature, said clutch engaging surfaces of the plate, armature, and driven means being all radially outwardly disposed of the coil and tapered faces, spring means interposed between the armature and pole piece oppositely disposed to the clutch engaging surface of the armature and a source of electrical energy for the coil.

3. A claim according to claim 1, wherein the taper on the pole piece is in the form of an annular V-shaped groove and the taper on the armature is in the form of an annular V-shaped projection.

4. A claim according to claim 2, wherein the driven means comprises a plurality of annular plates, and a plurality of like annular plates are mounted on the pole piece for rotation therewith and are disposed alternately with the first mentioned annular plates for engagement therewith.

ROBERT C. RUSSELL.

REFERENCES CITED

The following references are of record in the file of this patent:

UNITED STATES PATENTS

| Number | Name | Date |
| --- | --- | --- |
| 469,672 | Ayres | Mar. 1, 1892 |
| 735,755 | Green | Aug. 11, 1903 |
| 1,288,270 | Stuart | Dec. 17, 1918 |
| 1,623,349 | Knutsen | Apr. 5, 1927 |
| 1,934,783 | Arterburn | Nov. 14, 1933 |
| 2,214,391 | Weydell | Sept. 10, 1940 |
| 2,407,963 | Persons | Sept. 17, 1946 |

FOREIGN PATENTS

| Number | Country | Date |
| --- | --- | --- |
| 551,790 | Great Britain | Mar. 10, 1943 |
| 604,601 | Germany | Oct. 24, 1934 |
| 829,954 | France | July 18, 1938 |